Oct. 9, 1923.

F. W. LAMBIE

VELOCIPEDE

Filed July 20, 1922

Inventor
FREDERICK W. LAMBIE

By O. E. Carlsen
Attorney

Oct. 9, 1923.
F. W. LAMBIE
VELOCIPEDE
Filed July 20, 1922
1,470,576
2 Sheets-Sheet 2
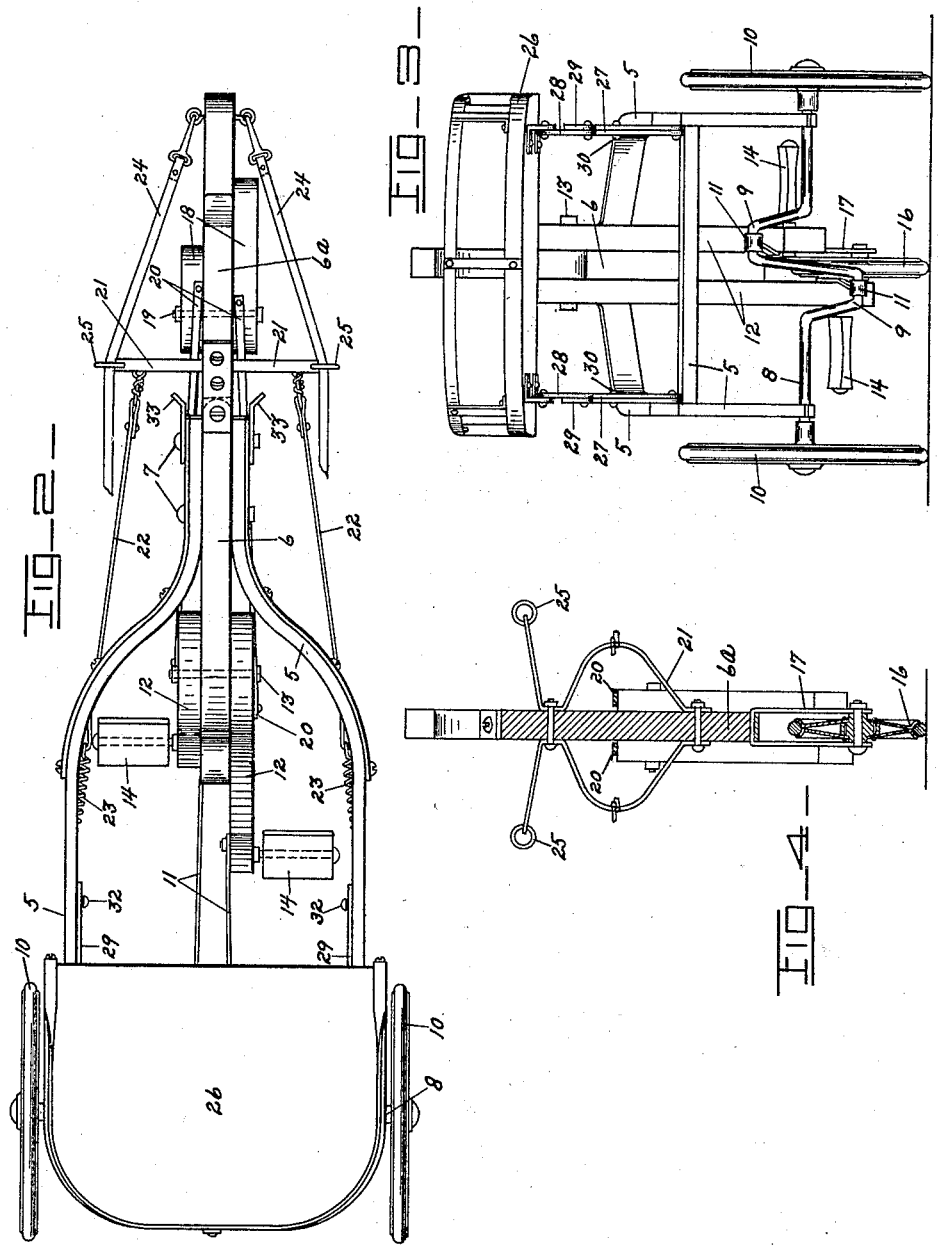
Inventor
FREDERICK W. LAMBIE
By *A. E. Carlsen*
Attorney Patented Oct. 9, 1923.

1,470,576

UNITED STATES PATENT OFFICE.

FREDERICK W. LAMBIE, OF MINNEAPOLIS, MINNNESOTA, ASSIGNOR TO ARTHUR M. LAMBIE, OF CHICAGO, ILLINOIS.

VELOCIPEDE.

Application filed July 20, 1922. Serial No. 576,177.

*To all whom it may concern:*

Be it known that I, FREDERICK W. LAMBIE, a citizen of the United States, residing at Minneapolis, in the county of Hennepin and State of Minnesota, have invented certain new and useful Improvements in Velocipedes, of which the following is a specification.

This invention relates to velocipedes for children and the main object is to provide a novel and practical foot propelled device in which the legs of the imitation figure of an animal, forming a part of the device, are moved in much the same manner as a natural animal. In the present instance a horse is represented and will be so termed throughout the description. Further objects will be disclosed in the course of the following specification and are clearly illustrated in the accompanying drawings, wherein:

Fig. 2 is a top or plan view of the device.

Fig. 3 is a rear end view of the device, and,

Fig. 4 is a sectional view, substantially on the line 4—4 in Fig. 1.

Figure 1:
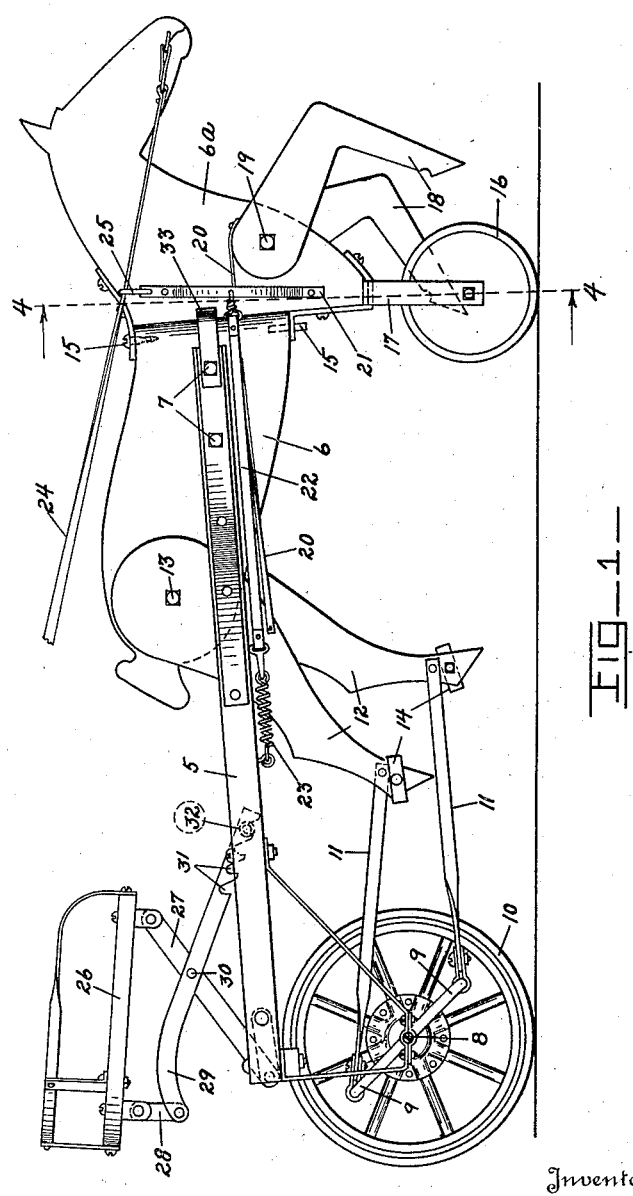
Fig. 1 is an elevation of the velocipede, the near rear wheel being removed.

Referring to the drawings by reference characters 5 designates the main frame, which is rigidly secured at its front end to the body 6 of the horse, by bolts 7. The rear end of the frame 6 is supported on a crank shaft 8, having cranks 9, and ground wheels 10 at its ends. The cranks 9 are connected by connecting rods 11 to the respective hind legs 12 of the horse. Said legs 12 are pivoted at their upper ends to the body 6, as at 13, while the lower ends of the legs are provided with pedals 14, which are to be engaged by the feet of the operator.

The body of the horse is jointed as at 15, the forward section being designated by the numeral 6ª. This section is supported on a small steering wheel 16 which is journaled in a yoke 17. It may be noted that the joint in the body 6—6ª inclines slightly from the true vertical, and that the wheel 16 is slightly forward of the joint; the result being that the weight of the horse will tend to keep the section 6ª thereof in a forward direction. 33 designates a pair of rigid stops or bracket members which prevent the section 6ª from turning too far to either side. The front legs 18 of the horse are suspended from a pivot bolt 19, and are connected by straps 20 to the hind legs 12, in such a manner that for each rearward movement of the hind legs the front legs of the horse will move forward, thus simulating the natural gait or movement of a real animal as near as practical.

On the sides of the section 6ª is provided a pair of outstanding brackets 21, to which are secured the front ends of a pair of traces 22. The rear ends of these traces are secured to springs 23, secured on the frame 5, so that the traces will be held yieldingly taut; with the result that the section 6ª may be properly steered to either side and will thereafter, when released, automatically return to its normal forward direction. The steering is accomplished by a pair of reins 24 which are secured to the face of the horse, and extend rearwardly, through hooks 25 in the bracket 21, to the driver's seat.

The seat 26 for the operator of the device is adjustably mounted on the frame, in a manner to allow adjustments for various sizes of children, as follows: The front end of the seat is connected to the extreme end of the frame 5 by a pair of link bars 27, while the rear end of the seat is supported on a pair of links 28 which connect it to the rear end of a pair of levers 29 fulcrumed at 30 to the bars 27. The front or lower ends of the levers 29 are provided with deep notches 31 for engagement with pins 32 in the frame 5. With this construction of seat support any desirable adjustment can be made in a moment's time, and without the use of tools.

It is understood that suitable modifications may be made in the general design and structural details of this device, provided, however, that such modifications come within the spirit and scope of the appended claims.

Having now therefore fully shown and described my invention what I claim to be new and desire to protect by Letters Patents is:

1. In a velocipede of character described, an animal figure supported in the front end thereof, said figure comprising front and rear sections, the former swinging on a pivot on the latter, a steering wheel supporting the front section, brackets extending laterally out from the sides of the front section, and spring connections between the brackets and the rear part of the velocipede.

2. In a velocipede of the character described, an animal figure supported in the front end thereof, said figure comprising front and rear sections, the former swinging on a substantially vertical pivot on the latter, a steering wheel supporting the front section, brackets extending laterally out from the sides of the front section, reins extending from the head of the figure rearwardly through said brackets, and spring means for normally holding the front section of the figure in a forward position.

In testimony whereof I affix my signature.

FREDERICK W. LAMBIE.